United States Patent
Yoshida et al.

(10) Patent No.: US 12,460,553 B2
(45) Date of Patent: Nov. 4, 2025

(54) SEALING DEVICE AND ROTATING MACHINE

(71) Applicant: MITSUBISHI HEAVY INDUSTRIES, LTD., Tokyo (JP)

(72) Inventors: Azumi Yoshida, Tokyo (JP); Ryuji Iwamoto, Tokyo (JP); Hideo Yamamoto, Tokyo (JP); Masaya Kawano, Tokyo (JP); Shin Nishimoto, Tokyo (JP); Tatsuro Furusho, Tokyo (JP); Shintaro Okumura, Tokyo (JP); Kenichi Sakashita, Tokyo (JP); Tsutomu Ogino, Tokyo (JP); Seemin Daryl Soh, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 0 days.

(21) Appl. No.: 18/683,334

(22) PCT Filed: Jan. 13, 2023

(86) PCT No.: PCT/JP2023/000727
§ 371 (c)(1),
(2) Date: Feb. 13, 2024

(87) PCT Pub. No.: WO2023/157520
PCT Pub. Date: Aug. 24, 2023

(65) Prior Publication Data
US 2025/0137383 A1    May 1, 2025

(30) Foreign Application Priority Data
Feb. 18, 2022   (JP) ................. 2022-023473

(51) Int. Cl.
*F01D 11/00* (2006.01)

(52) U.S. Cl.
CPC ........ *F01D 11/003* (2013.01); *F05D 2240/55* (2013.01)

(58) Field of Classification Search
CPC .................. F01D 11/003; F05D 2240/55
(Continued)

(56) References Cited

U.S. PATENT DOCUMENTS 5,362,072 A * 11/1994 Dalton ............... F16J 15/441
                                              415/173.5
5,374,068 A * 12/1994 Jewett ............... F16J 15/441
                                              277/303
(Continued)

FOREIGN PATENT DOCUMENTS

| CN | 103982247 A | 8/2014 |
|---|---|---|
| JP | H11-247617 A | 9/1999 |

(Continued)

OTHER PUBLICATIONS

International Search Report dated Apr. 4, 2023, issued in counterpart Application No. PCT/JP2023/000727. (12 pages).
(Continued)

*Primary Examiner* — J. Todd Newton
(74) *Attorney, Agent, or Firm* — WHDA, LLP (57) ABSTRACT

This sealing device comprises: a sealing member provided between a rotating part and a stationary part of a rotating machine in a radial direction of the rotating machine; a holding member for supporting the sealing member movably along the radial direction, the holding member being at least partly accommodated in a groove provided in the stationary part so as to extend along a circumferential direction; and a plurality of first biasing members provided at a plurality of different locations, respectively, in the circumferential direction, each first biasing member being accommodated in the holding member and configured to bias the sealing member
(Continued)

along a vertical direction with respect to the holding member. The plurality of first biasing members are configured to generate biasing forces, respectively, which are parallel to each other.

8 Claims, 7 Drawing Sheets

(58) Field of Classification Search
USPC .......................................................... 415/230
See application file for complete search history.

(56) References Cited

U.S. PATENT DOCUMENTS

| | | | | |
|---|---|---|---|---|
| 5,603,510 | A * | 2/1997 | Sanders | F01D 11/025 |
| | | | | 415/173.3 |
| 6,572,114 | B1 * | 6/2003 | Magoshi | F02C 7/28 |
| | | | | 277/411 |
| 6,572,115 | B1 * | 6/2003 | Sarshar | F16J 15/3288 |
| | | | | 277/412 |
| 6,676,369 | B2 * | 1/2004 | Brauer | F01D 11/025 |
| | | | | 415/113 |
| 6,758,477 | B2 * | 7/2004 | Brauer | F16J 15/164 |
| | | | | 277/379 |
| 6,840,519 | B2 * | 1/2005 | Dinc | F16J 15/445 |
| | | | | 277/303 |
| 2007/0237628 | A1 * | 10/2007 | Adis | F16J 15/441 |
| | | | | 415/170.1 |
| 2011/0068539 | A1 * | 3/2011 | Nakano | F01D 11/22 |
| | | | | 277/413 |
| 2014/0341733 | A1 * | 11/2014 | Lebigre | F16J 15/44 |
| | | | | 277/411 |

FOREIGN PATENT DOCUMENTS

| | | |
|---|---|---|
| JP | H11-257013 A | 9/1999 |
| JP | 2007-278294 A | 10/2007 |
| JP | 2018-141527 A | 9/2018 |

OTHER PUBLICATIONS

Notification Concerning Transmittal of International Preliminary Report on Patentability (Forms PCT/IB/326) issued in counterpart International Application No. PCT/JP2023/000727 mailed Aug. 29, 2024, with Forms PCT/IB/373, PCT/IB/338 and PCT/ISA/237. (13 pages).

* cited by examiner

SEALING DEVICE AND ROTATING MACHINE

TECHNICAL FIELD

The present disclosure relates to a sealing device and a rotating machine.

The present application claims priority based on Japanese Patent Application No. 2022-023473 filed in Japan on Feb. 18, 2022, the contents of which are incorporated herein by reference.

BACKGROUND ART

As a sealing device for reducing fluid leakage through a gap between a rotating part and a stationary part of a rotating machine such as a gas turbine or a steam turbine, a sealing device having a structure in which a sealing member is movable along a radial direction depending on an operation state or the like of the rotating machine may be used.

PTL 1 discloses a shaft sealing device that includes a movable sealing member that is provided between a rotor (rotating part) and a stator (stationary part) and that is movable along the radial direction. The movable sealing member is partially accommodated in a groove of a housing (stationary part) fixed to the stator, and is biased toward a radial outer side by an elastic member.

In the shaft sealing device of PTL 1, during a start/stop operation or a stop of the rotating machine, the movable sealing member is biased toward the radial outer side by the elastic member, and a clearance between the rotor and the movable sealing member is kept large. Meanwhile, during a load operation of the rotating machine, a pressure of a working fluid on a high-pressure side acts on an outer peripheral surface of the movable sealing member, and thereby a radial inward force (that is, a force that resists a biasing force of the elastic member) is applied to the movable sealing member. Accordingly, the movable sealing member is displaced radially inward in comparison to during the start/stop operation or the like, and the clearance between the rotor and the movable sealing member is kept small.

CITATION LIST

Patent Literature

[PTL 1] Japanese Unexamined Patent Application Publication No. 2018-141527

SUMMARY OF INVENTION

Technical Problem

In the prior art such as PTL 1, the biasing member for biasing the movable sealing member in the radial direction (for example, the elastic member of PTL 1) is provided to generate a biasing force along the radial direction. In a case where such biasing members are provided at a plurality of positions in a circumferential direction of the rotating machine, respectively, a plurality of the biasing members generate the biasing force along the radial direction at each of the positions in a circumferential direction. In this case, since directions of the biasing forces by the plurality of biasing members are not aligned, a movement of the sealing member may be hindered, for example, by close contact between parts depending on a state of contact between the sealing member and another stationary member. When the movement of the sealing member is hindered, an operation of the sealing device becomes unstable, which may lead to, for example, a decrease in an efficiency of the rotating machine.

In view of the above circumstances, an object of at least one embodiment of the present invention is to provide a sealing device and a rotating machine in which an operation is likely to be stable.

Solution to Problem

A sealing device according to at least one embodiment of the present invention includes
   a sealing member provided between a rotating part and a stationary part of a rotating machine in a radial direction of the rotating machine;
   a holding member that is at least partially accommodated in a groove provided in the stationary part to extend along circumferential direction and that supports the sealing member to be movable along the radial direction; and
   a plurality of first biasing members that are each configured to be accommodated in the holding member and to bias the sealing member along a vertical direction with respect to the holding member and that are provided at a plurality of positions that are different from each other in the circumferential direction, respectively,
   in which the plurality of first biasing members are each configured to generate a biasing force in directions parallel to each other.

In addition, a rotating machine according to at least one embodiment of the present invention includes
   a rotating part; a stationary part; and
   the sealing device described above for reducing fluid leakage between the rotating part and the stationary part.

Advantageous Effects of Invention

According to at least one embodiment of the present invention, there are provided a sealing device and a rotating machine in which an operation is likely to be stable.

DESCRIPTION OF EMBODIMENTS

Hereinafter, some embodiments of the present invention will be described with reference to the accompanying drawings. Dimensions, materials, shapes, relative arrangements, and the like of components described as embodiments or illustrated in the drawings are not intended to limit the scope of the present invention, but are merely explanatory examples.

(Configuration of Rotating Machine)

Figure 1:
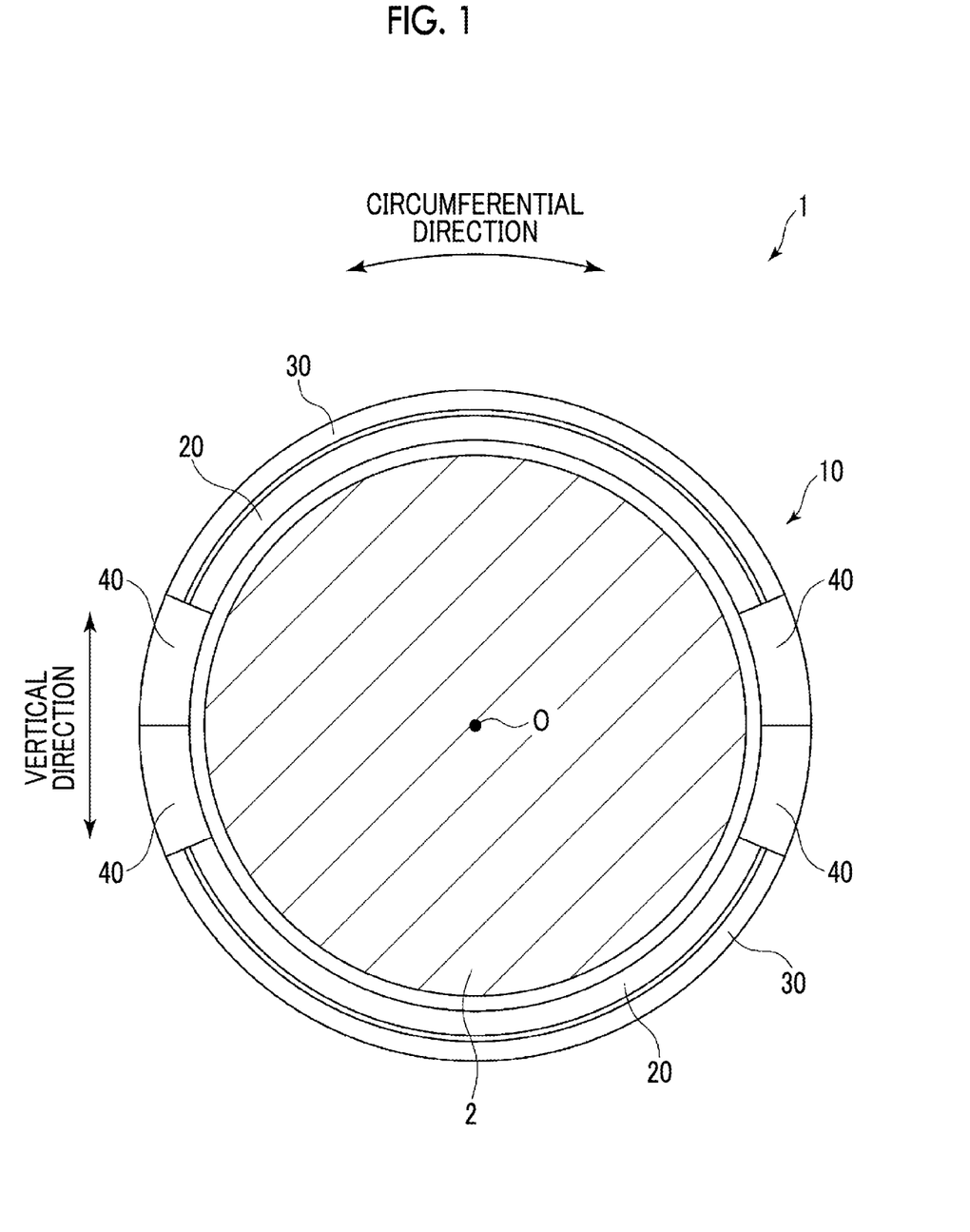
FIG. 1 is a partial schematic sectional view of a rotating machine according to one embodiment.
Figure 2:
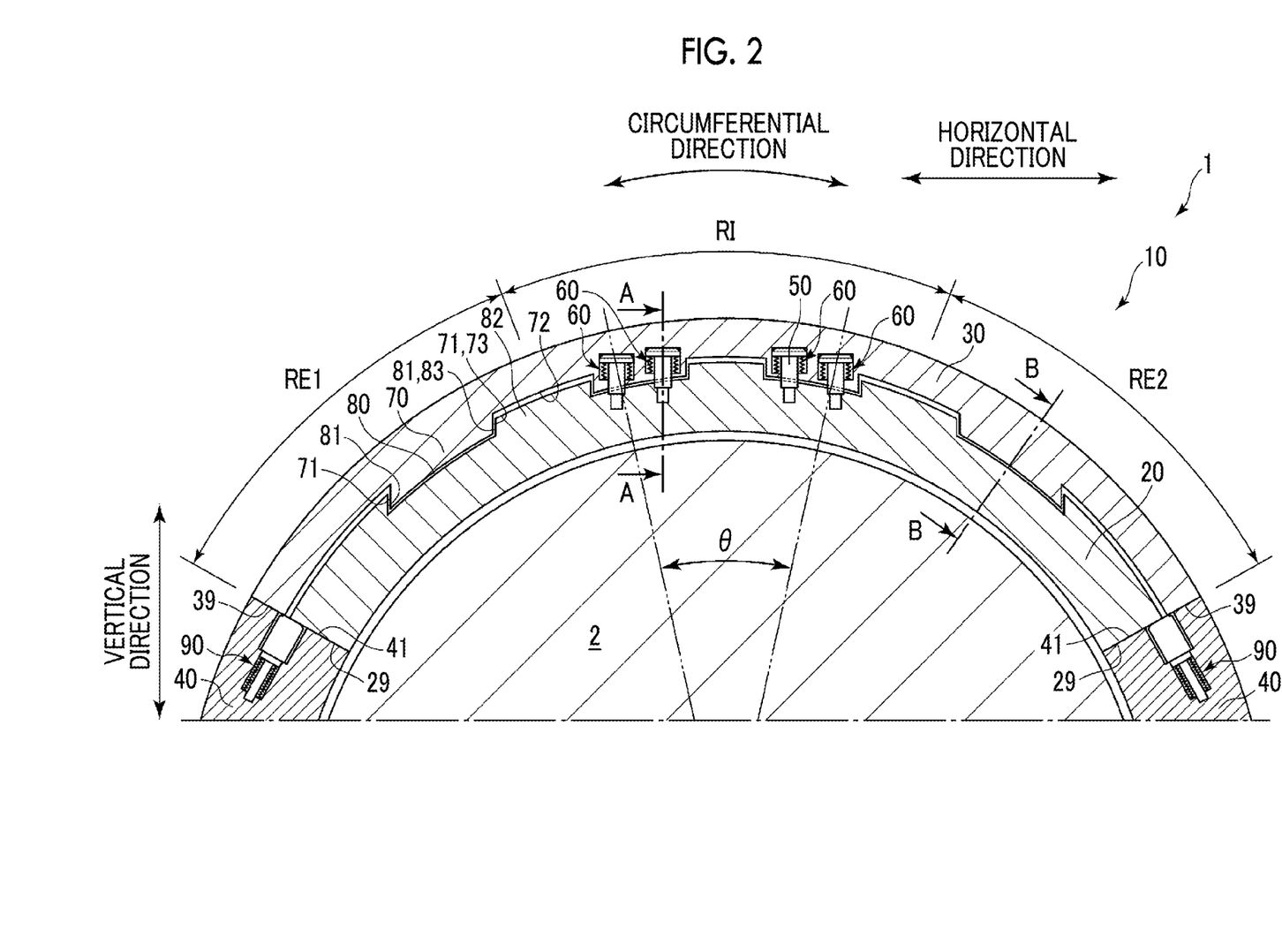
FIG. 2 is a view showing a part of the rotating machine shown in FIG. 1 in more detail, and is a view schematically showing a sealing device according to one embodiment.
Figure 3A:
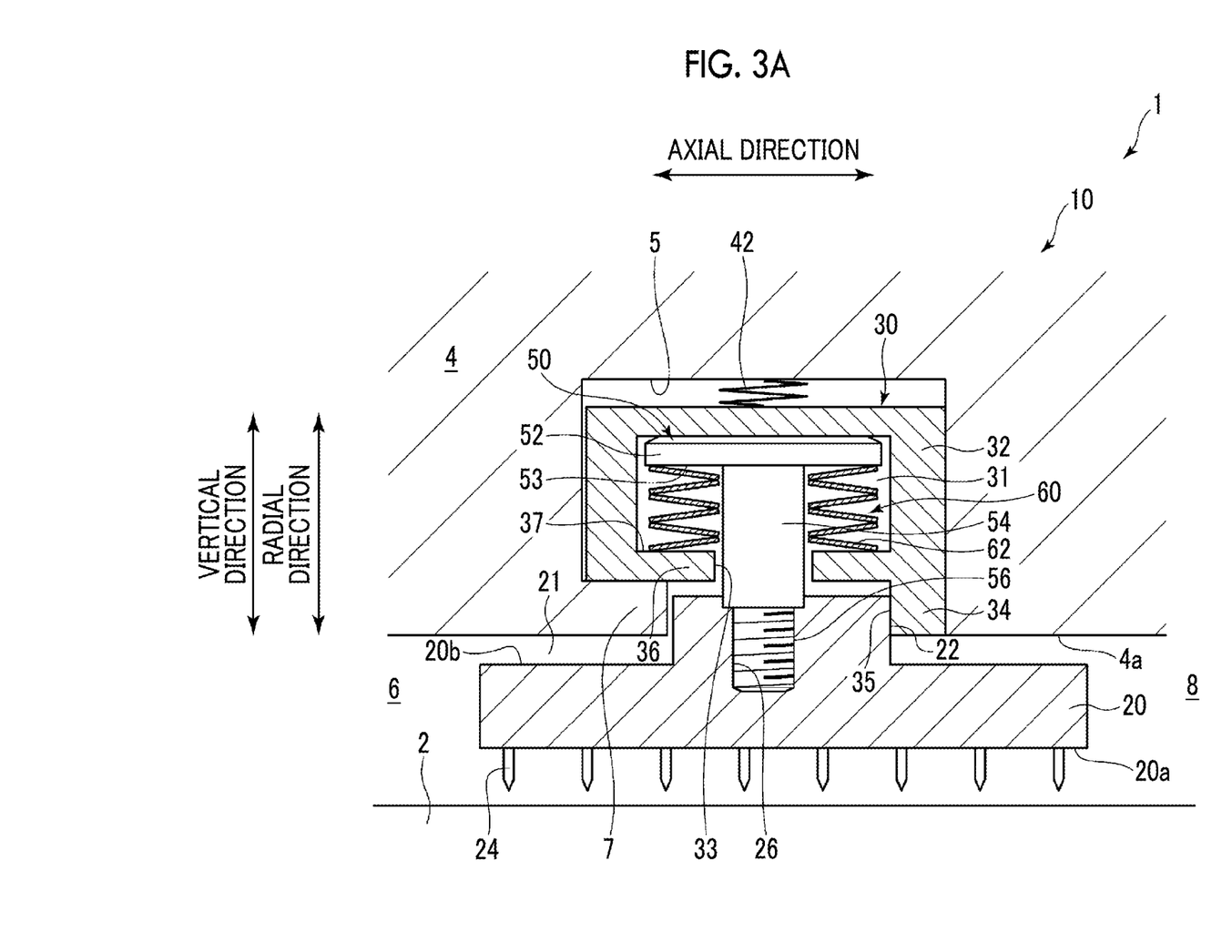
FIG. 3A is a schematic sectional view of the sealing device according to one embodiment, and is a sectional view taken along line A-A of FIG. 2.
Figure 3B:
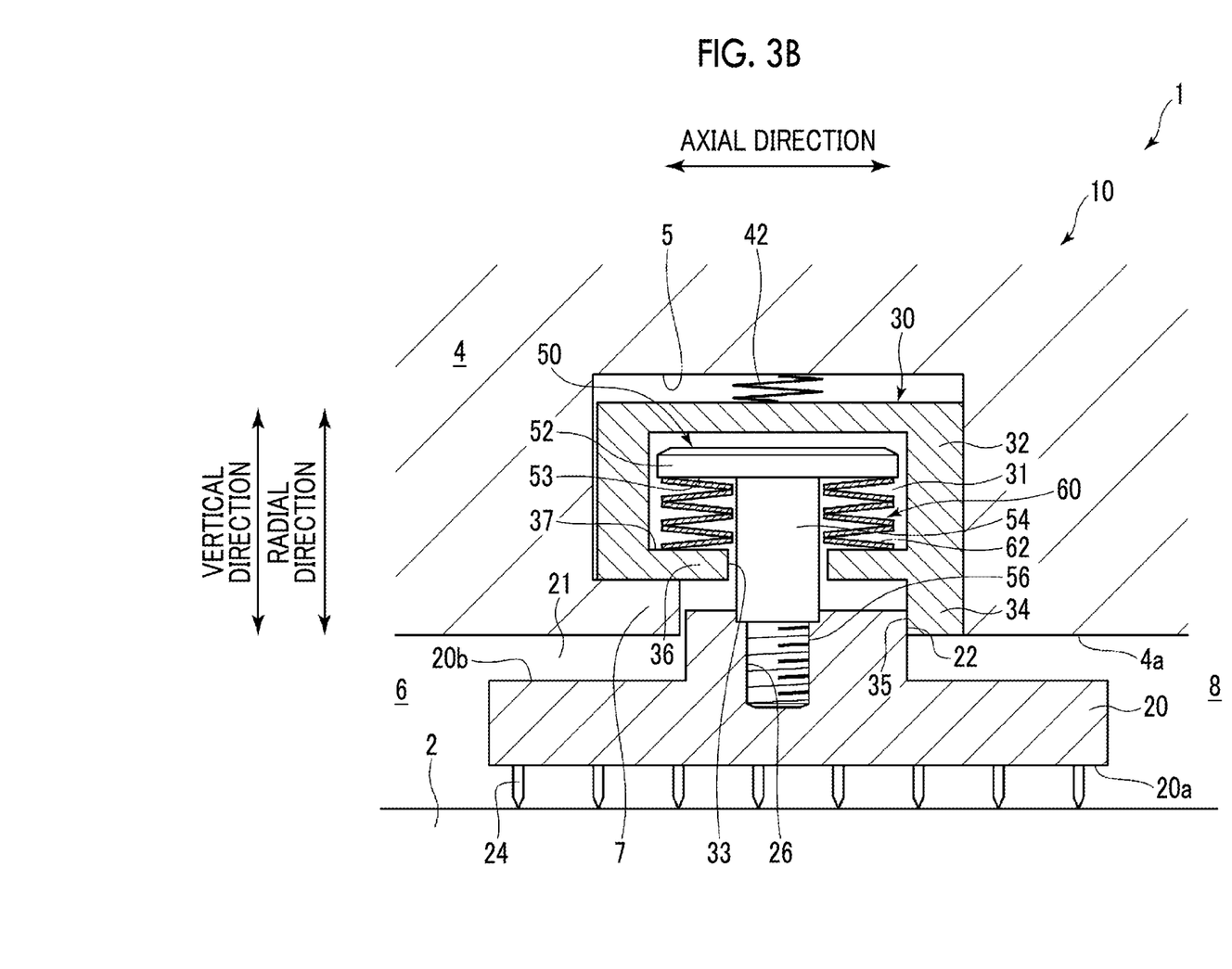
FIG. 3B is a schematic sectional view of the sealing device according to one embodiment, and is a sectional view taken along the line A-A of FIG. 2.
Figure 4A:
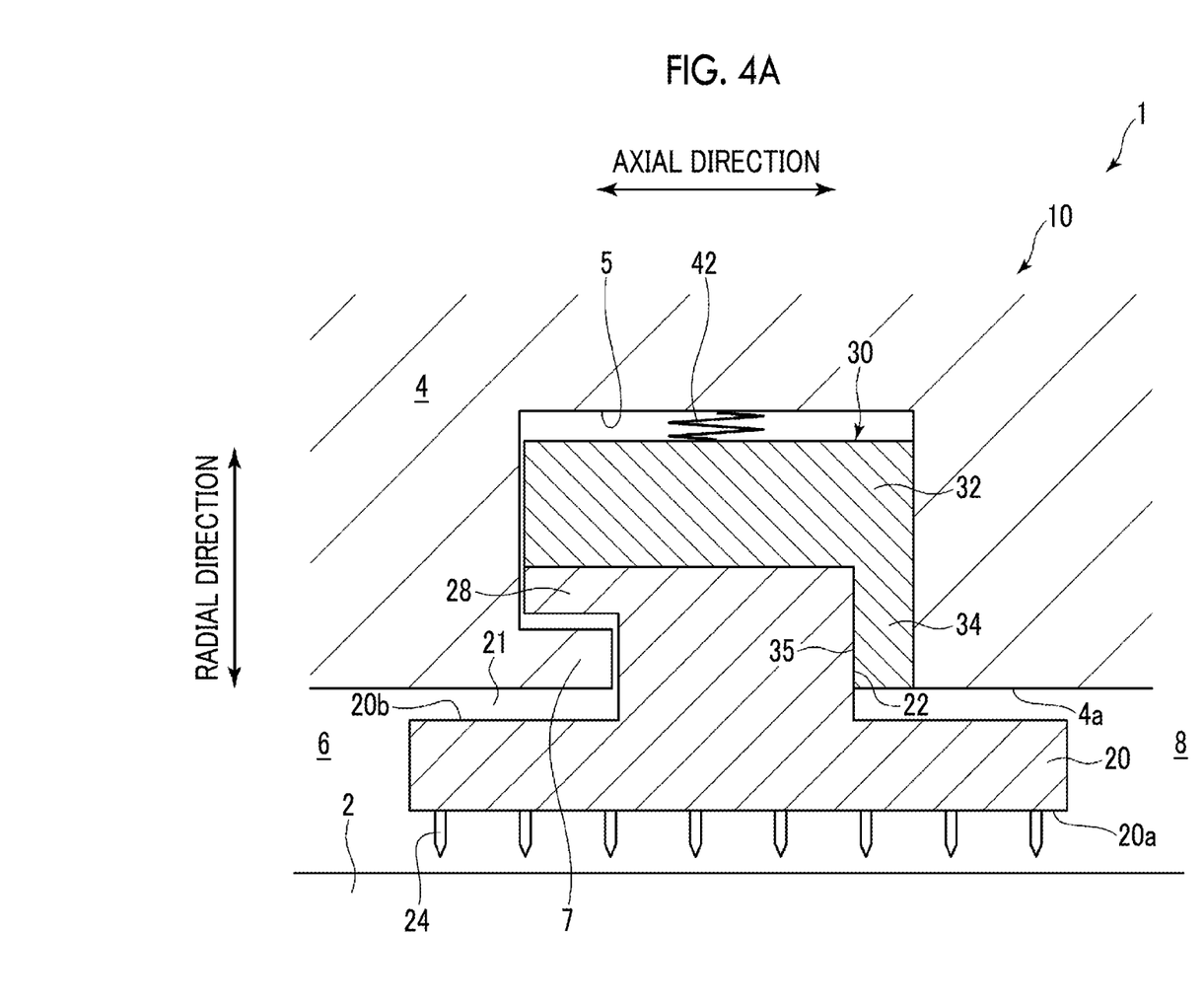
FIG. 4A is a schematic sectional view of the sealing device according to one embodiment, and is a sectional view taken along line B-B of FIG. 2.
Figure 4B:
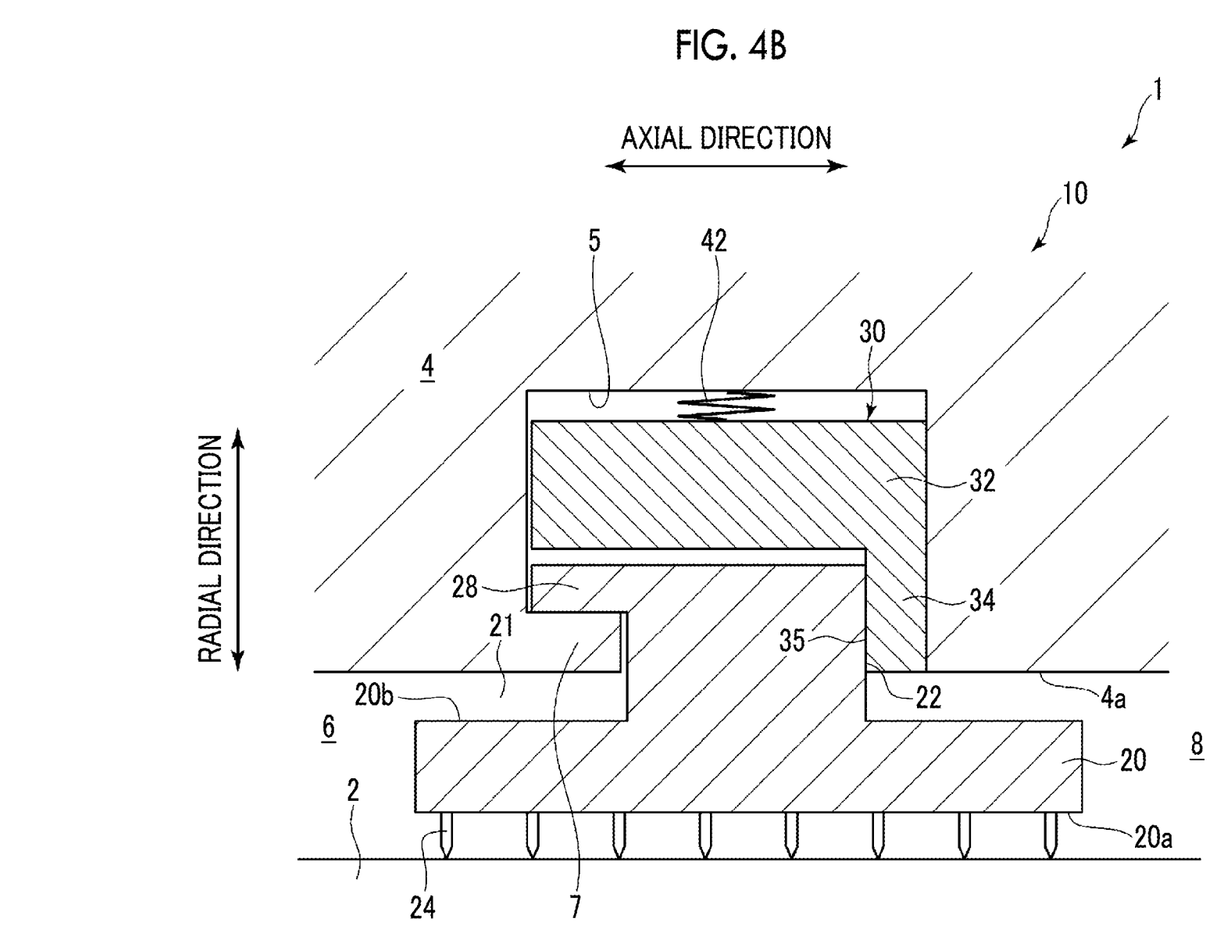
FIG. 4B is a schematic sectional view of the sealing device according to one embodiment, and is a sectional view taken along the line B-B of FIG. 2.

FIG. 1 is a partial schematic sectional view orthogonal to an axial direction of a rotating machine according to one embodiment. FIG. 2 is a view showing a part of the rotating machine shown in FIG. 1 in more detail, and is a view schematically showing a sealing device according to one embodiment. FIGS. 3A and 3B are schematic sectional views of the sealing device according to one embodiment, and are sectional views taken along line A-A of FIG. 2. FIGS. 4A and 4B are schematic sectional views of the sealing device according to one embodiment, and are sectional views taken along the B-B of FIG. 2. Here, FIGS. 3A and 4A are views showing a sealing device during a start/stop operation of the rotating machine. FIGS. 3B and 4B are views showing a sealing device during a load operation of the rotating machine.

The rotating machine according to some embodiments is a fluid machine such as a turbine (a gas turbine, a steam turbine, or the like), a compressor, or a pump. As shown in FIGS. 1 to 4B, a rotating machine 1 according to one embodiment includes a rotating part 2 (rotor) and a stationary part 4 (not shown in FIGS. 1 and 2) provided on an outer peripheral side of the rotating part 2. The rotating part 2 is rotatably supported around a rotation axis O (see FIG. 1) by a bearing (not shown). The stationary part 4 includes a casing accommodating the rotating part 2 and a stationary member supported by the casing. The stationary part 4 may include a vane ring for supporting a stator vane, or a stationary member (for example, a dummy ring, a holding ring, or the like) for supporting a sealing member or the like.

A fluid passage (typically, an annular passage) is formed between the rotating part 2 and the stationary part 4 of the rotating machine 1 in a radial direction. As shown in FIGS. 3A to 4B, the rotating machine 1 includes, among the above-described fluid passages, a high-pressure part 6 including a passage through which a relatively high-pressure fluid flows, and a low-pressure part 8 including a passage through which a fluid having a pressure lower than that of the fluid in the high-pressure part 6 flows. The high-pressure part 6 and the low-pressure part 8 are positioned offset from each other in the axial direction (direction of the rotation axis O).

The rotating machine 1 further includes a sealing device 10 to reduce fluid leakage through a gap between the rotating part 2 and the stationary part 4.

Hereinafter, the sealing device 10 according to some embodiments will be described in more detail.

(Configuration of Sealing Device)

As shown in FIGS. 1 to 4B, the sealing device 10 includes a movable sealing member 20 (sealing member) provided between the rotating part 2 and the stationary part 4 of the rotating machine 1 in the radial direction, and a holding member 30 for movably supporting the movable sealing member 20 along the radial direction. In one embodiment, as shown in FIG. 1, the movable sealing member 20 and the holding extend along a member 30 extend along a circumferential direction. That is, the movable sealing member 20 and the holding member 30 may have an arc shape or a ring shape.

In some embodiments, for example, as shown in FIGS. 1 and 2, the sealing device 10 may include a fixed sealing member 40 that is provided to be adjacent to the movable sealing member 20 in the circumferential direction. The fixed sealing member 40 is essentially configured not to move along the radial direction. In the exemplary embodiment shown in FIG. 1, the sealing device 10 includes the movable sealing members 20 each provided above and below the rotating part 2 in an up-down direction (vertical direction), and a plurality of the fixed sealing members 40 provided to be adjacent to an end part of the movable sealing member 20 in the circumferential direction on a side of the rotating part 2. As shown in FIG. 2, an end surface 29 of the movable sealing member 20 in the circumferential direction, an end surface 39 of the holding member 30 in the circumferential direction, and an end surface 41 of the fixed sealing member 40 in the circumferential direction may be arranged to face each other in the circumferential direction.

As shown in FIGS. 3A to 4B, the movable sealing member 20 is provided between the high-pressure part 6 and the low-pressure part 8 of the rotating machine 1 in the axial direction. In the exemplary embodiment shown in FIGS. 3A to 4B, a plurality of sealing fins 24 are provided on a surface 20a (inner peripheral surface) of the movable sealing member 20 that faces the rotating part 2. In some embodiments, a plurality of sealing fins may be provided on an outer peripheral surface of the rotating part 2 (that is, a surface facing the movable sealing member 20).

The movable sealing member 20 has an outer peripheral surface 20b facing the stationary part 4, and a gap 21 capable of communicating with the high-pressure part 6 is formed between the outer peripheral surface 20b and the stationary part 4 in the radial direction. That is, a pressure of the fluid from the high-pressure part 6 acts on the outer peripheral surface 20b of the movable sealing member 20.

The holding member 30 is at least partially accommodated in a groove 5 provided in the stationary part 4 to extend along the circumferential direction. The groove 5 is provided to be recessed radially outward from an inner peripheral surface 4a of the stationary part 4. The groove 5 may be provided in a casing (stationary part 4) accommodating the rotating part 2 of the rotating machine 1 or in a stationary member (stationary part 4) supported by the casing. The groove 5 may be provided, for example, in a dummy ring (stationary part 4) of a steam turbine or in a holding ring (stationary part 4) of a gas turbine. In an exemplary embodiment shown in FIGS. 3A to 4B, the holding member 30 includes a base part 32 that is accommodated in the groove 5, and a protrusion part 34 that protrudes radially inward from the base part 32.

A length of a portion of the holding member 30 that is accommodated in the groove 5 in the axial direction (a length of the base part 32 in the axial direction in the illustrated embodiment) is slightly shorter than a length of the groove 5 in the axial direction. Therefore, the holding member 30 is positioned in the axial direction by the groove 5 in a state where there is a clearance in the axial direction between the groove 5 and the holding member 30.

The holding member 30 may have an abutment part 36 that abuts on an axial-direction protrusion part 7 that protrudes in the axial direction in the groove 5 of the stationary part 4 in at least a partial region in the circumferential direction (for example, a portion shown in FIGS. 3A and 3B). Further, in the groove 5, a biasing member 42 that biases the holding member 30 toward a radial inner side may be provided on a radial outer side of the holding member 30 and on the radial inner side of the stationary part 4. The holding member 30 may be positioned in the radial direction by regulating a position of the holding member 30 in the radial direction by biasing the holding member 30 radially inward by means of the biasing member 42 and abutting the abutment part 36 on the axial-direction protrusion part 7.

The above-mentioned fixed sealing member 40 is provided between the rotating part 2 and the stationary part 4 in the radial direction. The fixed sealing member 40 may be at least partially accommodated in a groove provided in the stationary part 4 to extend along the circumferential direction.

In some embodiments, for example, as shown in FIGS. 3A and 3B, the sealing device 10 includes a spring stopper 52 accommodated in the holding member 30, and a shaft part 54 extending along the radial direction and connecting the spring stopper 52 and the movable sealing member 20. The movable sealing member 20 is supported by the holding member 30 to be movable along the radial direction via the shaft part 54 and the spring stopper 52 connected to the movable sealing member 20. The spring stopper 52 is accommodated inside an accommodation space 31 provided in the holding member 30. The shaft part 54 is provided to penetrate a hole 33 provided in the holding member 30 to communicate with the accommodation space 31. In the exemplary embodiment shown in FIGS. 3A and 3B, the sealing device 10 includes a bolt part 50, and the spring stopper 52 and the shaft part 54 described above are a part of the bolt part 50. In some embodiments, the spring stopper 52 and the shaft part 54 may be configured with separate members. The spring stopper 52 and/or the shaft part 54 may include a pin.

Here, a length of the hole 33 in the axial direction is smaller than a diameter of the spring stopper 52 and is larger than a diameter of the shaft part 54. In addition, a length of the accommodation space 31 in the radial direction is longer than a length of the spring stopper 52 in the radial direction. Therefore, the spring stopper 52 and the shaft part 54 (bolt part 50) are movable along the radial direction inside the accommodation space 31 while the spring stopper 52 does not come out of the accommodation space 31, and the movable sealing member 20 connected to the shaft part 54 (bolt part 50) is movable along the radial direction together with the spring stopper 52 and the shaft part 54 (bolt part 50). As shown in FIGS. 3A and 3B, the shaft part 54 may have one end part in which a screw 56 is formed and may be screwed into a screw hole 26 provided in the movable sealing member 20. In some embodiments, the shaft part 54 (for example, a pin) may be connected to the movable sealing member 20 by shrink-fitting, welding, or the like.

In some embodiments, the above-described spring stopper 52 and the shaft part 54 (bolt part 50) may be provided at each of a plurality of positions in the circumferential direction.

The sealing device 10 may include a first biasing member 60 configured to bias the movable sealing member 20 radially outward along the radial direction with respect to the holding member 30 (see FIGS. 3A and 3B). As shown in FIGS. 3A and 3B, the first biasing member 60 may be provided between a surface 53 of the spring stopper 52 that faces the radial inner side and a surface 37 of an inner wall surface forming the accommodation space 31 of the holding member 30 that faces the radial outer side. The first biasing member 60 may include an elastic member capable of generating an elastic force along the radial direction. In an exemplary embodiment shown in FIGS. 3A and 3B, the first biasing member 60 includes a plurality of disc springs 62. The plurality of disc springs 62 may be provided such that the shaft part 54 penetrates a hole in a central part of the plurality of disc springs 62.

In some embodiments, the first biasing member 60 may be provided at each of the plurality of positions in the circumferential direction. In addition, a plurality of the spring stoppers 52 and a plurality of the shaft parts 54 (for example, a plurality of the bolt parts 50) may be provided to correspond to a plurality of the first biasing members 60, respectively.

At a position where the first biasing member 60 or the spring stopper 52 and the shaft part 54 (bolt part 50) are not provided in the circumferential direction, for example, as shown in FIGS. 4A and 4B, the movable sealing member 20 may be partially accommodated in the groove 5 of the stationary part 4. The movable sealing member 20 may include an engaging part 28 that is positioned between the base part 32 of the holding member 30 and the axial-direction protrusion part 7 of the stationary part 4 in the radial direction and that is capable of engaging with the axial-direction protrusion part 7. As shown in FIG. 3B, the engaging part 28 engages with the axial-direction protrusion part 7 when the movable sealing member 20 is positioned on the radial inner side.

Here, an operation of the above-described sealing device 10 will be briefly described. During a start/stop operation or a stop of the rotating machine 1, the movable sealing member 20 is biased toward the radial outer side by the first biasing member 60, and a clearance between the rotating part 2 and the movable sealing member 20 (or the sealing fin 24) is kept large (see FIGS. 3A and 4A). When a load of the rotating machine 1 increases, a pressure difference between the high-pressure part 6 and the low-pressure part 8 increases, whereby a difference occurs between the pressure acting on the outer peripheral surface 20b of the movable sealing member 20 (the pressure of a high-pressure fluid in the high-pressure part 6) and a pressure acting on the inner peripheral surface 20a (a pressure that decreases from a high-pressure side toward a low-pressure side). When a radial inward force applied to the movable sealing member 20 due to this pressure difference overcomes a radial outward biasing force of the first biasing member 60, the movable sealing member 20 moves to a radial inner position, and the clearance between the rotating part 2 and the movable sealing member 20 (or the sealing fin 24) is reduced (see FIGS. 3B and 4B). During a load operation of the rotating machine 1 (during a rated load operation or the like), the pressure of the high-pressure fluid of the high-pressure part 6 continues to act on the outer peripheral surface 20b of the movable sealing member 20, and the pressure difference described above is maintained. Therefore, the clearance between rotating part 2 and the movable sealing member 20 (or the sealing fin 24) remains small (see FIGS. 3B and 4B).

In some embodiments, for example, as shown in FIG. 2, the sealing device 10 includes the plurality of first biasing members 60 provided at a plurality of positions different from each other in the circumferential direction, respectively. In addition, each of the plurality of first biasing members 60 is configured to bias the movable sealing member 20 along the vertical direction with respect to the holding member 30, and the plurality of first biasing members 60 are each configured to generate biasing forces in directions parallel to each other. That is, the plurality of first biasing members 60 are each configured to generate biasing forces in directions parallel to each other along the vertical direction.

Here, in the present specification, when an angle between the directions of the biasing forces of any two first biasing members 60 among the plurality of first biasing members 60 is 5 degrees or less, it is assumed that these biasing forces are parallel to each other.

In the exemplary embodiment shown in FIG. 2, each of the plurality of first biasing members 60 is provided between the surface 53 of the spring stopper 52 that faces the radial inner side and the surface 37 of the inner wall surface forming the accommodation space 31 of the holding member 30 that faces the radial outer side (see FIGS. 3A and 3B). The plurality of shaft parts 54 are provided to extend in directions parallel to each other along the vertical direction.

In the illustrated embodiment, the plurality of first biasing members 60 (four first biasing members 60 in FIG. 2) are provided in a vicinity of an uppermost part of the sealing device 10 in the up-down direction. In some embodiments, the plurality of first biasing members 60 may be provided in a vicinity of a lowermost part of the sealing device 10 in the up-down direction.

According to the above-described embodiment, the plurality of first biasing members 60 provided at positions different from each other in the circumferential direction generate biasing forces in directions parallel to each other along the vertical direction. Therefore, since the biasing forces acting on the movable sealing member 20 by means of the plurality of first biasing members 60 are parallel to each other, a movement of the movable sealing member 20 is less likely to be hindered. Therefore, it is easy to stabilize the operation of the sealing device 10 including the movable sealing member 20.

In some embodiments, a number density of the plurality of first biasing members 60 in a central region RI (see FIG. 2) of the movable sealing member 20 that includes a position of the rotation axis O (see FIG. 1) of the rotating part 2 in a horizontal direction is larger than a number density of the plurality of first biasing members 60 in end part regions RE1 and RE2 (see FIG. 2) including an end of the movable sealing member 20 in the circumferential direction (a position of the end surface 29). In an example shown in FIG. 2, the movable sealing member 20 includes the central region RI, the end part region RE1 including a position of one end surface 29 of both end surfaces 29 of the movable sealing member 20 in the circumferential direction, and the end part region RE2 including a position of the other end surface 29.

In the present specification, the number density of the first biasing members 60 means the number of the first biasing members 60 present within a range per unit length of the movable sealing member 20 in the circumferential direction.

In the exemplary embodiment shown in FIG. 2, four first biasing members 60 are provided in the central region RI, and since the first biasing member 60 is not provided in the end part regions RE1 and RE2, the number density of the first biasing members 60 in the central region RI is larger than the number density of the first biasing members 60 in the end part regions RE1 and RE2.

According to the above-described embodiment, in the movable sealing member 20, the first biasing member 60 is concentratedly arranged in the central region RI where it is easy to secure a size of a space where the biasing member is installed in the vertical direction and the horizontal direction. Therefore, it is easy to obtain the sealing device 10 in which a plurality of biasing members that generate biasing forces parallel to each other are arranged. Therefore, it is possible to more effectively suppress a hindrance of the movement of the movable sealing member 20 due to a misalignment of the directions of the biasing forces of the plurality of biasing members.

In some embodiments, the plurality of first biasing members 60 are arranged over an angle range of 10 degrees or more, 15 degrees or more, or 20 degrees or more about the rotation axis O of the rotating part 2 in the circumferential direction. That is, in some embodiments, an angle θ (see FIG. 2) between straight lines connecting two first biasing members 60 arranged at both ends in the circumferential direction among the plurality of first biasing members 60 and the rotation axis O, respectively, is 10 degrees or more, 15 degrees or more, or 20 degrees or more.

According to the above-described embodiment, since the plurality of first biasing members 60 are arranged over a wide angle range of 10 degrees or more, 15 degrees or more, or 20 degrees or more, even when the movable sealing member 20 extending over a wide range in the circumferential direction is adopted, the biasing force can be stably applied by the plurality of first biasing members 60.

In some embodiments, the plurality of first biasing members 60 are arranged over an angle range of 60 degrees or less or 45 degrees or less about the rotation axis O of the rotating part 2 in the circumferential direction (that is, the above-mentioned angle θ is 60 degrees or less or 45 degrees or less), and in other opening ranges, a biasing member for biasing the movable sealing member 20 with respect to the holding member 30 is not arranged. In this way, by providing the first biasing member 60 concentratedly in the central region of the movable sealing member 20 and not providing the biasing member in the end part region, it is easy to obtain the sealing device 10 in which a plurality of biasing members that generate biasing forces parallel to each other are arranged.

In some embodiments, for example, as shown in FIG. 2, when viewed from the axial direction, one of the holding member 30 or the movable sealing member 20 includes a protruding part that protrudes toward the other of the holding member 30 or the movable sealing member 20 in the vertical direction, and the other of the holding member 30 or the movable sealing member 20 includes a recessed part with which the protruding part can be engaged. When viewed from the axial direction, each of a side surface of the protruding part and a side surface of the recessed part extends along the vertical direction.

In the exemplary embodiment shown in FIG. 2, the holding member 30 has a protruding part 70 that protrudes from the holding member 30 toward the movable sealing member 20 in the vertical direction, and the movable sealing member 20 has a recessed part 80 that can be engaged with the protruding part 70. Each of a side surface 71 of the protruding part 70 and a side surface 81 of the recessed part 80 extends along the vertical direction. Further, the movable sealing member 20 has a protruding part 82 that protrudes from the movable sealing member 20 toward the holding member 30 in the vertical direction, and the holding member 30 has a recessed part 72 that can be engaged with the protruding part 82. Each of a side surface 83 of the protruding part 82 and a side surface 73 of the recessed part 72 extends along the vertical direction.

According to the above-described embodiment, each of the side surface 71 of the protruding part 70 and the side surface 81 of the recessed part 80 extends along the vertical direction, or each of the side surface 83 of the protruding part 82 and the side surface 73 of the recessed part 72 extends along the vertical direction. Therefore, when the movable sealing member 20 moves along the vertical direction with respect to the stationary part 4 and the holding member 30, a gap between the side surface 71 of the protruding part 70 and the side surface 81 of the recessed part 80 or a gap between the side surface 83 of the protruding part 82 and the side surface 73 of the recessed part 72 is easily maintained, and close contact between the movable sealing member 20 and the holding member 30 is unlikely to occur. Therefore, the hindrance of the movement of the movable sealing member 20 can be suppressed more effectively.

In some embodiments, for example, as shown in FIG. 2, the sealing device 10 includes a second biasing member 90 configured to apply a biasing force acting in the vertical direction to the end surface 29 of the movable sealing member 20 in the circumferential direction.

Figure 5:
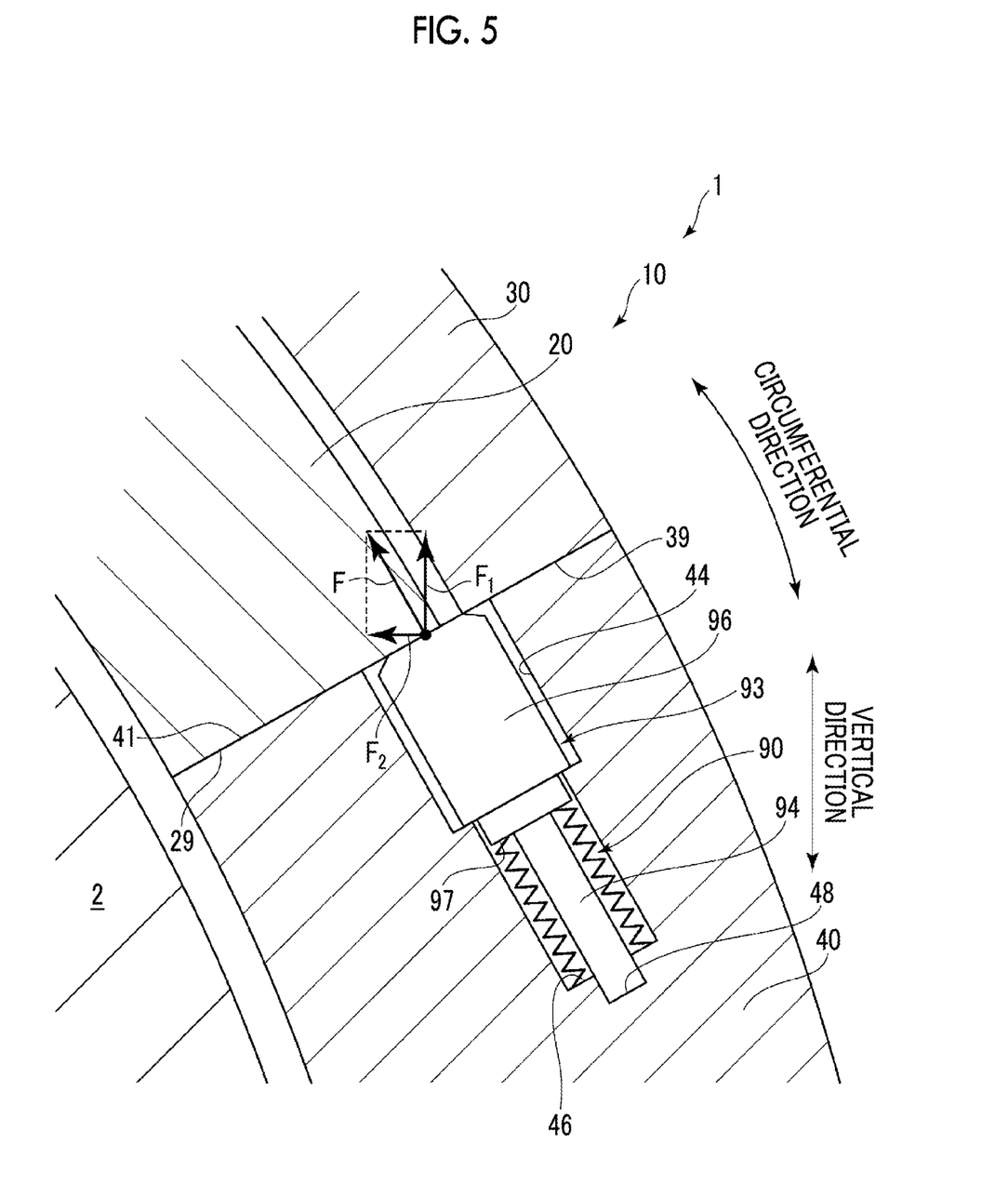
FIG. 5 is a partially enlarged view of FIG. 2 that includes an end part of a movable sealing member in a circumferential direction.

Here, FIG. 5 is a partially enlarged view of FIG. 2 that includes the end part of the movable sealing member 20 in a circumferential direction. In an exemplary embodiment shown in FIG. 5, the second biasing member 90 is configured to generate a biasing force along the circumferential direction, and the biasing force is transmitted to the movable sealing member 20 via a biasing force transmission part 93.

For describing the embodiment shown in FIG. 5, the biasing force transmission part 93 includes a core rod 94 and a cap part 96 provided at a tip portion of the core rod 94. The biasing force transmission part 93 and the second biasing member 90 are accommodated in a hole 44 that opens to the end surface 41 of the fixed sealing member 40 in the circumferential direction. The end surface 41 of the fixed sealing member 40, the end surface 29 of the movable sealing member 20, and the end surface 39 of the holding member 30 each extend along the radial direction. The hole 44 extends linearly along the circumferential direction and has a bottom surface 46 at an end part opposite to an opening. A base end portion of the core rod 94 is fitted in a recessed part 48 recessed from the bottom surface 46 of the hole 44. The second biasing member 90 is provided between the bottom surface 46 of the hole 44 and an end surface 97 of the cap part 96 of the biasing force transmission part 93. The second biasing member 90 may include an elastic member such as a spring.

A biasing force F (a biasing force in a direction from the fixed sealing member 40 toward the movable sealing member 20) along the circumferential direction that is generated by the second biasing member 90 is transmitted to the movable sealing member 20 via the biasing force transmission part 93. The biasing force F transmitted to the movable sealing member 20 has a component $F_1$ in the vertical direction and a component $F_2$ in the horizontal direction. Therefore, the biasing force of the second biasing member 90 acts on the movable sealing member 20 in the vertical direction. The component $F_2$ in the horizontal direction may be offset by a component in the horizontal direction of the biasing force by the second biasing member 90 on the other end side (left side in FIG. 2) of the movable sealing member 20.

According to the above-described embodiment, in addition to the plurality of first biasing members 60, a second biasing member 90 for applying a biasing force acting in the vertical direction to the end surface 29 of the movable sealing member 20 in the circumferential direction is provided. Therefore, even in a case where the biasing force in the vertical direction applied to the movable sealing member 20 is insufficient by only providing the plurality of first biasing members 60, the biasing force can be complemented by the biasing force of the second biasing member 90. Therefore, it is easier to stabilize the operation of the sealing device 10 including the movable sealing member 20.

In some embodiments, for example, as shown in FIGS. 3A to 4B, the movable sealing member 20 has a sliding surface 22 that is adjacent to the protrusion part 34 of the holding member 30 in the axial direction and that is slidable with the protrusion part 34. The protrusion part 34 has a facing surface 35 facing the sliding surface 22 of the movable sealing member 20 in the axial direction. That is, the sliding surface 22 of the movable sealing member 20 and the facing surface 35 of the protrusion part 34 are slidable with each other.

In the above-described embodiment, the protrusion part 34 of the holding member 30 that is accommodated in the groove 5 provided in the stationary part 4 and the sliding surface 22 of the movable sealing member 20 are adjacent to each other in the axial direction. Therefore, when the movable sealing member 20 moves along the radial direction, the sliding surface 22 of the movable sealing member 20 and the protrusion part 34 of the holding member 30 slide with each other. Therefore, in a case where a sliding part (the sliding surface 22 of the movable sealing member 20 and the protrusion part 34 of the holding member 30) is worn, by replacing the holding member 30 and/or the movable sealing member 20, a surface of the sliding part can be maintained in a desired state (for example, a state with a desired friction coefficient). In this way, since it is easy to maintain the surface of the sliding part in the desired state, it is easy to maintain a state in which the movable sealing member 20 operates stably in the rotating machine 1. That is, it is easy to maintain a stable operation of the sealing device 10 in the rotating machine 1.

In a conventional sealing device that does not include the holding member, a biasing member for biasing the movable sealing member toward the radial outer side is provided between the movable sealing member and the stationary member in the radial direction. Therefore, in a case where the sealing device is installed in the rotating machine, inserting the movable sealing member into the groove along the circumferential direction may be hindered by a preload (a force along the radial direction) applied to the biasing member.

In this regard, in the above-described embodiment, the movable sealing member 20 is supported by the holding member 30, and the first biasing member 60 for biasing the movable sealing member 20 toward the radial outer side is accommodated in the holding member 30. Therefore, in a state where the movable sealing member 20 and the first biasing member 60 are assembled to the holding member 30, by inserting the holding member 30 into the groove 5 of the stationary part 4 in the circumferential direction, the sealing device 10 including the movable sealing member 20 can be installed in the rotating machine 1. Therefore, even in a state where a relatively large preload is applied to the first biasing member 60, the preload does not hinder the insertion of the sealing device 10 into the groove, and the sealing device 10 can be smoothly installed in the rotating machine 1.

For example, the contents described in each embodiment are understood as follows.

(1) A sealing device (10) according to at least one embodiment of the present invention includes a sealing member (for example, the movable sealing member 20 described above) provided between a rotating part (2) and a stationary part (4) of a rotating machine (1) in a radial direction of the rotating machine;

a holding member (30) that is at least partially accommodated in a groove (5) provided in the stationary part to extend along a circumferential direction and that supports the sealing member to be movable along the radial direction; and a plurality of first biasing members (60) that are each configured to be accommodated in the holding member and to bias the sealing member along a vertical direction with respect to the holding member and that are provided at a plurality of positions that are different from each other in the circumferential direction, respectively, in which the plurality of first biasing members are each configured to generate a biasing force in directions parallel to each other.

According to a configuration of (1) above, the plurality of first biasing members provided at positions different from each other in the circumferential direction generate biasing forces in directions parallel to each other along the vertical direction. Therefore, since the biasing forces acting on the sealing member by means of the plurality of first biasing members are parallel to each other, a movement of the sealing member is less likely to be hindered. Therefore, it is easy to stabilize the operation of the sealing device including the movable sealing member.

(2) In some embodiments, in the configuration of (1) above, the sealing member extends along the circumferential direction, and a number density of the plurality of first biasing members in a central region (RI) of the sealing member including a position of a rotation axis (O) of the rotating part in a horizontal direction is larger than a number density of the plurality of first biasing members in an end part region (RE1, RE2) including an end of the sealing member in the circumferential direction.

According to a configuration of (2) above, in the sealing member, the first biasing member is concentratedly arranged in the central region where it is easy to secure a size of a space where the biasing member is installed in the vertical direction and the horizontal direction. Therefore, it is easy to obtain the sealing device in which a plurality of biasing members that generate biasing forces parallel to each other are arranged. Therefore, it is possible to more effectively suppress the hindrance of the movement of the sealing member due to a misalignment of the directions of the biasing forces of the plurality of biasing members.

(3) In some embodiments, in the configuration of (1) or (2) above, the sealing device further includes a plurality of shaft parts (54) provided corresponding to the plurality of first biasing members, respectively, and attached to the sealing member; and a plurality of spring stoppers (52) provided corresponding to the plurality of shaft parts, respectively, and accommodated in the holding member, in which each of the plurality of first biasing members is provided between a surface (53) of the spring stopper that faces a radial inner side and a surface (37) of an inner wall surface of the holding member that faces a radial outer side.

According to a configuration of (3) above, the sealing member is supported by the holding member to be movable along the radial direction via the plurality of spring stoppers and the plurality of shaft parts, and the biasing force along the vertical direction is applied to the sealing member via the plurality of spring stoppers and the plurality of shaft parts by the plurality of first biasing members provided between the plurality of spring stoppers and the inner wall surface of the holding member, respectively. In this way, with a simple configuration using the plurality of spring stoppers and the plurality of shaft parts, the biasing force of the biasing member can be applied to the sealing member while the sealing member is movably supported along the radial direction.

(4) In some embodiments, in any of the configurations of (1) to (3) above, the sealing device further includes a second biasing member (90) configured to apply a biasing force acting in the vertical direction to an end surface of the sealing member in the circumferential direction.

According to a configuration of (4) above, in addition to the above-described first biasing member, a second biasing member for applying a biasing force acting in the vertical direction to the end surface of the sealing member in the circumferential direction is provided. Therefore, even in a case where the biasing force in the vertical direction applied to the sealing member is insufficient by only providing the plurality of first biasing members, the biasing force can be complemented by the biasing force of the second biasing member. Therefore, it is easier to stabilize the operation of the sealing device including the movable sealing member.

(5) In some embodiments, in any of the configurations of (1) to (4) above, one of the holding member or the sealing member includes a protruding part (70 or 82) protruding toward the other of the holding member or the sealing member along the vertical direction, the other of the holding member or the sealing member includes a recessed part (80 or 72) with which the protruding part can be engaged, and when viewed from an axial direction, each of a side surface (71 or 83) of the protruding part and a side surface (81 or 73) of the recessed part extends along the vertical direction.

According to a configuration of (5) above, since each of the side surface of the protruding part and the side surface of the recessed part extends along the vertical direction, when the sealing member moves along the vertical direction with respect to the stationary part and the holding member, a gap between the side surface of the protruding part and the side surface of the recessed part is easily maintained, and close contact between the sealing member and the holding member is unlikely to occur. Therefore, the hindrance of the movement of the sealing member can be suppressed more effectively.

(6) In some embodiments, in any of the configurations of (1) to (5) above, the plurality of first biasing members are arranged over an angle range of 10 degrees or more about a rotation axis of the rotating part in the circumferential direction.

According to a configuration of (6) above, since the plurality of first biasing members are arranged over a wide angle range of 10 degrees or more, even when the sealing member extending over wide range in the circumferential direction is adopted, the biasing force can be stably applied by the plurality of first biasing members.

(7) A rotating machine (1) according to at least one embodiment of the present invention includes a rotating part (2); a stationary part (4); and the sealing device (10) according to any of (1) to (6) above for reducing fluid leakage between the rotating part and the stationary part.

According to a configuration of (7) above, the plurality of first biasing members provided at positions different from each other in the circumferential direction generate biasing forces in directions parallel to each other along the vertical direction. Therefore, since the biasing forces acting on the sealing member by means of the plurality of first biasing members are parallel to each other, a movement of the sealing member is less likely to be hindered. Therefore, it is easy to stabilize the operation of the sealing device including the movable sealing member.

Although the embodiments of the present invention have been described, the present invention is not limited to the above-described embodiments, and includes modifications of the above-described embodiments and a combination of these embodiments as appropriate.

In the present specification, an expression representing a relative or absolute arrangement such as "in a certain direction", "along a certain direction", "parallel", "orthogonal", "center", "concentric", or "coaxial" does not strictly represent only such an arrangement, but also a tolerance or a state of being relatively displaced with an angle or a distance to the extent that the same function can be obtained.

For example, expressions such as "identical", "equal", and "homogeneous" indicating that things are in an equal state do not strictly represent only the equal state, but also a tolerance or a state where there is a difference to the extent that the same function can be obtained.

In addition, in the present specification, an expression representing a shape such as a quadrangular shape or a cylindrical shape does not represent only a shape such as a quadrangular shape or a cylindrical shape in a geometrically strict sense, but also a shape including an uneven portion, a chamfered portion, and the like within a range in which the same effect can be obtained.

In addition, in the present specification, expressions such as "comprising", "including", or "having" one component are not exclusive expressions excluding the presence of other components.

REFERENCE SIGNS LIST 1 rotating machine
2 rotating part
4 stationary part
4a inner peripheral surface
5 groove
6 high-pressure part
7 axial-direction protrusion part
8 low-pressure part
10 sealing device
20 movable sealing member
20a inner peripheral surface
20b outer peripheral surface
21 gap
22 sliding surface
24 sealing fin
26 screw hole
28 engaging part
29 end surface
30 holding member
31 accommodation space
32 base part
33 hole
34 protrusion part
35 facing surface
36 abutment part
37 surface
39 end surface
40 fixed sealing member
41 end surface
42 biasing member
44 hole
46 bottom surface
48 recessed part
50 bolt part
52 spring stopper
53 surface
54 shaft part
56 screw
60 first biasing member
62 disc spring
70 protruding part
71 side surface
72 recessed part
73 side surface
80 recessed part
81 side surface
82 protruding part
83 side surface
90 second biasing member
93 biasing force transmission part
94 core rod
96 cap part
97 end surface
F biasing force
O rotation axis
RE1 end part region
RE2 end part region
RI central region

The invention claimed is:

1. A sealing device comprising:
a sealing member provided between a rotating part and a stationary part of a rotating machine in a radial direction of the rotating machine;
a holding member that is at least partially accommodated in a groove provided in the stationary part to extend along a circumferential direction and that supports the sealing member to be movable along the radial direction; and
a plurality of first biasing members that are each configured to be accommodated in the holding member and to bias the sealing member along a vertical direction with respect to the holding member and that are provided at a plurality of positions that are different from each other in the circumferential direction, respectively,
wherein the plurality of first biasing members are each configured to generate a biasing force in directions parallel to each other,
wherein the holding member includes
a base part that is accommodated in the groove, and
a protrusion part that protrudes radially inward from the base part, and
the sealing member has a sliding surface that is adjacent to the protrusion part in an axial direction and that is slidable relative to the protrusion part.

2. The sealing device according to claim 1,
wherein the sealing member extends along the circumferential direction, and
a number density of the plurality of first biasing members in a central region of the sealing member including a position of a rotation axis of the rotating part in a horizontal direction is larger than a number density of the plurality of first biasing members in an end part region including an end of the sealing member in the circumferential direction.

3. The sealing device according to claim 1, further comprising:
a plurality of shaft parts provided corresponding to the plurality of first biasing members, respectively, and attached to the sealing member; and
a plurality of spring stoppers provided corresponding to the plurality of shaft parts, respectively, and accommodated in the holding member,
wherein each of the plurality of first biasing members is provided between a surface of the spring stopper that faces a radial inner side and a surface of an inner wall surface of the holding member that faces a radial outer side.

4. The sealing device according to claim 1, further comprising:
a second biasing member configured to apply a biasing force acting in the vertical direction to an end surface of the sealing member in the circumferential direction.

5. The sealing device according to claim 1,
wherein one of the holding member or the sealing member includes a protruding part protruding toward the other of the holding member or the sealing member along the vertical direction,
the other of the holding member or the sealing member includes a recessed part with which the protruding part can be engaged, and
when viewed from an axial direction, each of a side surface of the protruding part and a side surface of the recessed part extends along the vertical direction.

6. The sealing device according to claim 1,
wherein the plurality of first biasing members are arranged over an angle range of 10 degrees or more about a rotation axis of the rotating part in the circumferential direction.

7. The sealing device according to claim 1,
wherein the plurality of first biasing members are arranged only in an angle range of 45 degrees or less about a rotation axis of the rotating part in the circumferential direction.

8. A rotating machine comprising:
the rotating part;
the stationary part; and
the sealing device according to claim 1 for reducing fluid leakage between the rotating part and the stationary part.

* * * * *